(12) United States Patent
Kuczynski et al.

(10) Patent No.: US 10,011,725 B2
(45) Date of Patent: *Jul. 3, 2018

(54) PAINT COMPOSITIONS WITH COLOR CHANGE CHARACTERISTICS

(71) Applicant: International Business Machines Corporation, Armonk, NY (US)

(72) Inventors: Joseph Kuczynski, North Port, FL (US); Marvin M. Misgen, Rochester, MN (US); Debra Neuman-Horn, Rochester, MN (US); Joseph F. Prisco, Rochester, MN (US); Kevin J. Przybylski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 32 days.

This patent is subject to a terminal disclaimer.

(21) Appl. No.: 15/184,503

(22) Filed: Jun. 16, 2016

(65) Prior Publication Data

US 2017/0362447 A1    Dec. 21, 2017

(51) Int. Cl.
*B41M 5/28* (2006.01)
*C09D 5/29* (2006.01)
(Continued)

(52) U.S. Cl.
CPC .............. *C09D 5/29* (2013.01); *B41M 5/287* (2013.01); *C09D 7/41* (2018.01); *C09D 7/65* (2018.01);
(Continued)

(58) Field of Classification Search
CPC .... B41M 5/28; B41M 5/287; B41M 2205/18; B41M 2205/24; C09D 5/29; C09D 7/007; C09D 11/50; C09D 11/54
(Continued)

(56) References Cited

U.S. PATENT DOCUMENTS

| 5,735,940 | A  | 4/1998 | Coller |
| 7,074,264 | B2 | 7/2006 | Vilarinho Dias |

(Continued)

FOREIGN PATENT DOCUMENTS

| CN | 103073957 B | 10/2014 |
| JP | 4159322 B2 | 10/2008 |
| WO | 2004109017 A2 | 12/2004 |

OTHER PUBLICATIONS

Katz, David A., "Disappearing Ink", 2006, viewed May 10, 2016, 3 pp.

(Continued)

*Primary Examiner* — Bruce H Hess
(74) *Attorney, Agent, or Firm* — Patterson + Sheridan, LLP

(57) ABSTRACT

A paint composition includes a fluid and a coloring agent in the fluid. The fluid maintains the coloring agent in a first protonation state. The coloring agent exhibits a first color characteristic in the first protonation state. The paint composition includes microcapsules in the fluid. The paint composition also includes a chemical compound in the microcapsules. Rupture of at least a portion of the microcapsules is configured to release the chemical compound and expose the coloring agent to the chemical compound. Exposure of the coloring agent to the chemical compound changes the coloring agent from the first protonation state with the first color characteristic to a second protonation state with a second color characteristic. The second color characteristic is visually distinct from the first color characteristic.

20 Claims, 1 Drawing Sheet

(51) Int. Cl.
    *G09F 1/00*      (2006.01)
    *C09D 7/41*      (2018.01)
    *C09D 7/65*      (2018.01)
    *C09D 7/40*      (2018.01)
    C09D 161/24      (2006.01)
    B05D 5/06        (2006.01)

(52) U.S. Cl.
    CPC ............. *C09D 7/70* (2018.01); *G09F 1/00* (2013.01); *B05D 5/065* (2013.01); *C09D 161/24* (2013.01)

(58) Field of Classification Search
    USPC ........ 503/201, 215; 106/31.23, 32.32, 31.64, 106/31.32
    See application file for complete search history.

(56) References Cited

U.S. PATENT DOCUMENTS

| | | |
|---|---|---|
| 2006/0236470 A1 | 10/2006 | Sabnis et al. |
| 2007/0287766 A1 | 12/2007 | Kuczynski et al. |
| 2012/0148741 A1 | 6/2012 | Silva |
| 2014/0228270 A1 | 8/2014 | Messant et al. |
| 2015/0037495 A1 | 2/2015 | Silva |

OTHER PUBLICATIONS

Alvarez-Lorenzo, et al., "Review: Light-Sensitive Intelligent Drug Delivery Systems", The American Society of Photobiology, Photochemistry and Photobiology, 2009, pp. 848-860.

Yuan, et al., "Photocleavable Microcapsules Built from Photoreactive Nanospheres:, 2005 American Chemical Society," Langmuir 2005,, pp. 9374-7380.

Saravanan, et al., "Hydroxypropyl Methylcellulose Based Cephalexin Extended Release Tablets: Influence of Tablet Formulation, Hardness and Storage on in Vitro Release Kinetics", Chemical Society of Japan, Chem. Pharm. Bull. 51 (8), 2003, pp. 978-983.

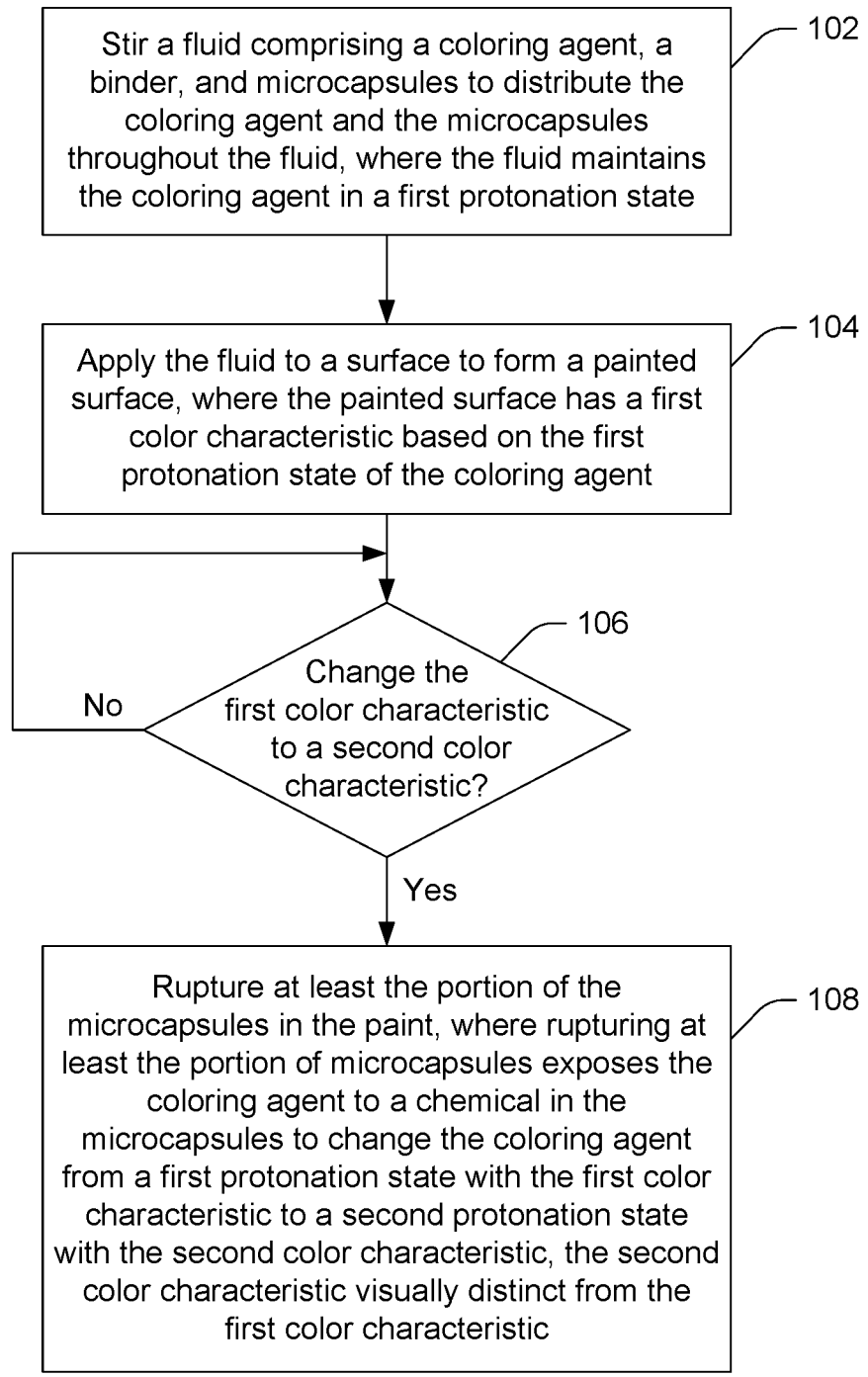

PAINT COMPOSITIONS WITH COLOR CHANGE CHARACTERISTICS

I. FIELD OF THE DISCLOSURE

The present disclosure relates generally to paint compositions with color change characteristics and to systems and methods for making and using the paint compositions.

II. BACKGROUND

In certain applications, paint applied to a surface may be repeatedly changed frequently to accommodate different events or circumstances. For example, two or more sports teams or sporting events may share a common venue. To accommodate different designs (e.g., logos) for the sports teams, one or more first designs may be painted at one or more first locations of the venue prior to a first game (e.g., the end zones of a football field, midfield, or both). After the first game, the one or more first designs may be removed (e.g., abraded from the field or painted over), and one or more second logos may be painted at one or more second locations of the venue for a second game. After the second game, the one or more second designs may be removed and additional designs (e.g., the one or more first designs or other designs for other teams or events) may be painted. Repeatedly painting a surface to have different designs may be expensive, time consuming, labor intensive, harmful to the surface, or combinations thereof.

III. SUMMARY OF THE DISCLOSURE

According to a particular embodiment, a paint composition includes a fluid and a coloring agent in the fluid. The fluid maintains the coloring agent in a first protonation state. The coloring agent exhibits a first color characteristic in the first protonation state. The paint composition includes microcapsules in the fluid. The paint composition also includes a chemical compound in the microcapsules. Rupture of at least a portion of the microcapsules is configured to release the chemical compound and expose the coloring agent to the chemical compound. Exposure of the coloring agent to the chemical compound changes the coloring agent from the first protonation state with the first color characteristic to a second protonation state with a second color characteristic. The second color characteristic is visually distinct from the first color characteristic.

According to another particular embodiment, a method includes stirring a fluid comprising a coloring agent, a binder, and microcapsules to distribute the binder, the coloring agent, and the microcapsules in the fluid. The fluid maintains the coloring agent in a first protonation state. The microcapsules contain a chemical compound. Rupture of at least a portion of the microcapsules is configured to release the chemical compound and expose the coloring agent to the chemical compound. Exposure of the coloring agent to the chemical compound changes the coloring agent from the first protonation state to a second protonation state. The method includes applying the fluid to a surface to form a painted surface. The painted surface has a first color characteristic based on the first protonation state of the coloring agent before rupture of at least the portion of the microcapsules. The painted surface has a second color characteristic based on the second protonation state in response to rupture of at least the portion of the microcapsules.

According to another particular embodiment, a method of changing a first color characteristic of a paint applied to a surface is disclosed. The paint includes a binder, a coloring agent in the binder, and microcapsules in the binder. The method includes rupturing at least a portion of the microcapsules in the paint. Rupturing at least the portion of microcapsules exposes the coloring agent to a chemical in the microcapsules to change the coloring agent from a first protonation state with the first color characteristic to a second protonation state with a second color characteristic. The second color characteristic is visually distinct from the first color characteristic Features and other benefits that characterize embodiments are set forth in the claims annexed hereto and form a further part hereof. However, for a better understanding of the embodiments, and of the advantages and objectives attained through their use, reference should be made to the Drawing and to the accompanying descriptive matter.

IV. BRIEF DESCRIPTION OF THE DRAWING

FIG. 1 is a flow diagram showing a particular embodiment of a method of applying and using a paint composition with a color change characteristic.

V. DETAILED DESCRIPTION

Paint compositions with color change characteristics and systems and methods of using the paint compositions are disclosed. The paint compositions are formulated to undergo a color change (e.g., from a first color to a second color, from colored to colorless, or from colorless to colored) based on a change of a coloring agent from a first protonated state to a second protonated state. The coloring agent may include one or more acid-base indicators that change color due to exposure to acids or bases (e.g., change color in response to a change in pH that protonates or deprotonates the one or more acid-base indicators).

The coloring agent may include one or more acid-base indicators. Each acid-base indicator may have a particular color when in a particular range of pH values. For example, the acid-base indicators of the coloring agent may include thymolphthalein, phenolphthalein, alizarin yellow GG, or combinations thereof. Thymolphthalein is blue in a deprotonated state (e.g., when at a pH above about 10.5) and is colorless when in a protonated state (e.g., when at a pH below about 9.3). Phenolphthalein is magenta in a first deprotonated state (e.g., when at a pH above between about 10 and about 13) and is colorless when in a first protonated state (e.g., when at a pH between about 0 and about 8). Alizarin yellow GG is yellow in a deprotonated state (e.g., when at a pH above about 11) and is colorless when in a protonated state (e.g., when at a pH level below about 9). A wide variety of colors can be made using appropriate concentrations of thymolphthalein, phenolphthalein, and alizarin GG in their deprotonated states. In other embodiments, other acid-base indicators or additional acid-base indicators may be used as components of the coloring agent to achieve particular colors.

In some embodiments, the coloring agent may include pigments or dyes in addition to the one or more acid-base indicators. The pigments or dyes may be stable in the paint composition and may not be subject to color change due to a change in a protonation state. When the one or more acid-base indicators are changed from the first protonation state to a second protonation state, the acid-base indicators may have a second color characteristic that corresponds to being colorless or substantially colorless, and the paint may change color to the color determined by the pigments or dyes. For example, a portion of a design formed from the paint composition may be a shade of brown. The coloring agent may be made of one or more green pigments and sufficient amounts of acid-base indicators (e.g., thymolphthalein, phenolphthalein, alizarin yellow GG, or combinations thereof) to achieve the shade of brown when in the first protonation state in combination with the presence of the one or more green pigments. After applying the paint composition and changing the protonation state of the acid-base indicators, the paint may change from the shade of brown to a shade of green based on the presence of the one or more green pigments in the coloring agent.

The paint compositions may include a binder that forms a film when the paint composition is applied to a surface and dried. The binder may include polyvinylalcohol, polyvinylpyrrolidone, polyoxyethylene, polyvinyl acetate, gelatin, gum arabic, rosin compounds, cellulose compounds (e.g., cellulose resins, methyl cellulose, ethyl cellulose, acetyl cellulose, propyl cellulose, butyl cellulose, hydroxyethyl cellulose, hydroxypropyl cellulose, higher alkyl celluloses, etc.), phenolic resins, acrylics (e.g., polyacrylates, polymethacrylates, etc.), polyurethanes, styrenic polymers, polyvinyl chloride, copolymers (e.g., acrylate/styrenic copolymers, methacrylate/styrenic copolymers, vinyl chloride/styrenic copolymers, etc.), alkyds, polyesters, epoxy polymers, polyamides, polyimides, alkylated ureas, or combinations thereof.

The paint compositions may include one or more fillers so that the paint compositions or resulting paints have particular properties. The fillers may include buffering compounds (e.g., an acid or a base and a conjugate salt of the acid or base) to maintain the coloring compounds in a first protonation state in the paint composition, one or more rheology agents to provide the paint compositions with appropriate viscosities, one or more surfactants, one or more drying agents, other chemicals, or combinations thereof.

In an embodiment, the coloring agent may include thymolphthalein, phenolphthalein, alizarin yellow GG, or combinations thereof so that when the coloring agent is in a deprotonated state, the coloring agent has a particular color. The buffering compound may include a basic solution (e.g., an aqueous sodium hydroxide solution) that maintains the coloring agent in the deprotonated state.

The paint compositions may also include a chemical compound in microcapsules. The chemical compound may include a pH adjusting component (e.g., one or more acids or one or more bases), one or more solvents, one or more surfactants, other chemicals, or combinations thereof. When the microcapsules, or a sufficient number of the microcapsules, are ruptured, the coloring agent undergoes a protonation change due to exposure of the coloring agent to the pH adjusting component and the color of the paint applied as the paint composition undergoes the color change. Thus, the paint applied as the paint composition is color changing or removable (e.g., can be made colorless) without a need to repaint or remove the paint. In an embodiment, the microcapsules may include acid (e.g., one or more organic acids (e.g., acetic acid), one or more inorganic acids (e.g., hydrochloric acid, phosphoric acid, nitric acid, etc.), or combinations thereof) that is able to change a first protonation state of the coloring agent (e.g., a deprotonated state) to a second protonated state (e.g., a protonated state).

In an embodiment, one or more paint compositions having particular colors may be applied to paint a first design on a surface (e.g., a field of a sports venue). The paint composition may be allowed to become dry paint. The first design may include indicia, one or more colors, one or more shapes, one or more patterns, or combinations thereof. The first design may cover at least a portion of a second design present on the surface. At a subsequent time, the first design may be exposed to one or more conditions that rupture at least a portion of the microcapsules in the dry paint of the first design. Rupturing at least the portion of the microcapsules in the dry paint may cause a color change to the first design. The color change may include having one or more of the coloring agents in the design become transparent or substantially transparent, having one or more of the coloring agents change to a particular color (e.g., green to resemble the color of green grass when the surface is grass or artificial grass), or combinations thereof. When the color change includes the coloring agents becoming transparent or substantially transparent, the second design that underlies the first design may become visible. Use of the paint compositions to paint the first design may save time, labor, and expense needed to repaint the second design by changing color characteristics of the first design to a second characteristic (e.g., clear or substantially clear) by rupturing at least a portion of microcapsules in the paint of the first design.

The microcapsules in the paint composition may be formed using an emulsion technique. For example, the microcapsule contents and components of a polymer shell (e.g., one or more monomers) may be selected to form an "oil" phase (e.g., a hydrophobic phase), which may be mixed into a water phase. A stirring speed of the oil-in-water combination may be selected to form microcapsules of a specific size (or having a desired range of sizes or mean size). For example, a fast stir speed may result in formation (on average) of smaller microcapsules than a slow stir speed. A cross-linking agent may be added to the oil-in-water combination to cause formation of the polymer shell around the microcapsule contents, which are in the oil phase. After curing, the microcapsules may be rinsed and filtered or sieved to remove microcapsules that are too large.

The size of the microcapsules may be described in terms of bulk or average values based on filters or sieves used to remove large microcapsules, to remove small microcapsules (e.g., fines), or both. The microcapsules may be small enough to not be visually distracting (e.g., undetectable or barely detectable to an unaided human eye). The microcapsules may be filtered or sieved so that the microcapsules have a characteristic dimension (e.g., a diameter) of about 50 micrometers ($\mu m$) or less, about 25 $\mu m$ or less, or about 10 $\mu m$ or less.

The microcapsules may be ruptured to expose one or more coloring agents in dried paint made from the paint compositions to the content contained in the microcapsules. The content may include an acid or base that changes a protonation state of the one or more coloring agents. A presence of a large number of microcapsules in the paint relative to an amount of coloring agent needed for the paint composition to have a first color characteristic (e.g., a particular visible color), water of the acid or base, one or more solvents (e.g., acetone) in the content contained in the microcapsules, or combinations thereof, may facilitate diffusion of the acid or base in the paint to the coloring agent in the paint when microcapsules are ruptured. The microcapsules may be ruptured by exposure to heat, by exposure to certain wavelengths of light (i.e., electromagnetic radiation), by exposure to a magnetic field with a strength over a strength threshold, by exposure to external pressure, or by exposure to combinations thereof.

In an embodiment, the microcapsules may contain an evaporative fluid to facilitate rupture of the microcapsules. The evaporative fluid may be chemically compatible (e.g., non-reactive) with the other components contained in the microcapsules and the polymer shells of the microcapsules. The evaporative fluid may have a relatively low boiling point as compared to water such that subjecting the microcapsules to heat (e.g., by convection, conduction, radiation, or combinations thereof) causes at least a portion of the contents of the microcapsules to undergo a phase change to a gas. A change in phase to a gas of at least the portion of the contents of a microcapsule may increase internal pressure within the microcapsule and rupture of the microcapsule. Thus, the boiling point of the evaporative fluid establishes a threshold temperature such that heating the evaporative fluid to or above the threshold temperature causes the microcapsules to rupture. In some embodiments, heat may be applied by exposing the paint to microwave radiation. The microwave radiation may radiatively heat the evaporative fluid, water in the microcapsules, the microcapsules, or combinations thereof. The resulting heat may increase pressure within the microcapsules and rupture at least a portion of the microcapsules.

In another embodiment, the polymer shell of the microcapsules may be formed of a polymer that degrades when exposed to ultraviolet light (e.g., UVB light). Exposure of the microcapsules to the ultraviolet light may degrade the microcapsules and cause the microcapsules to weaken, rupture, or both. When the microcapsules are weakened by the ultraviolet light, subjecting the paint to external pressure (e.g., rolling a heavy cylinder across the surface) may rupture at least a portion of the microcapsules in the paint.

In an embodiment, the microcapsules may include organosilane-coated magnetic nanoparticles covalently bound to the polymer shells of the microcapsules. For example, (3-aminopropyl) trimethylsilane-coated magnetite nanoparticles may be incorporated into the polymer shell of a urea-formaldehyde microcapsule during in situ polymerization. Exposure of the microcapsules to a magnetic field (e.g., a static or time varying magnetic field) having a threshold strength may stimulate the organosilane-coated magnetic nanoparticles and rupture at least a portion of the microcapsules. One or more permanent magnets, one or more electromagnets, or combinations thereof, may be used to expose the microcapsules to the magnetic field.

Thus, a paint composition is described that has a first color characteristic (e.g., a first particular color) when applied to a surface and dried to paint, and that, when exposed to one or more conditions, is configured to change to paint having a second color characteristic (e.g., a non-visible appearance or substantially non-visible appearance) different than the first color characteristic. The paint composition may include a fluid that includes a binder, a coloring agent, and microcapsules. The fluid may include a buffering compound (e.g., an acid or base and a conjugate salt of the acid or base) that maintains the coloring agent in a first protonation state. In the first protonation state, the coloring agent exhibits a first color characteristic (e.g., the first particular color). The coloring agent may include one or more acid-base indicators in appropriate concentrations to result in the first color characteristic. The paint composition may be applied to a surface that is to be painted.

After the paint composition has been applied to the surface and dried to paint with the first color characteristic, a user may determine to change the paint to the second characteristic. After the determination, the microcapsules in the paint may be subjected to one or more conditions that result in rupture of at least a portion of the microcapsules in the paint (e.g., exposure to heat, exposure to ultraviolet light, exposure to external force, exposure to a magnetic field of at least a threshold strength, or combinations thereof). Rupture of at least a portion of the microcapsules in the paint may release contents of the microcapsules in the paint. The contents of the microcapsules may diffuse to the coloring agent and change the first protonation state of the coloring agent to a second protonation state so that the paint has the second color characteristic.

FIG. 1 is a flow diagram showing a particular embodiment of a method 100 of using a paint composition with color change characteristics (e.g., a paint composition described above). The paint composition may be provided to a user from a supplier as a kit or as a single fluid.

When the paint composition is provided as a kit, the kit may include a plurality of color agents, a first fluid, and instructions. The color agents may include particular acid-base indicators that enable a first color characteristic (e.g., a particular color) for the paint composition when mixed in appropriate amounts in the first fluid as indicated by the instructions. The coloring agents may be provided as solids, liquids, or combinations thereof. In an embodiment, the coloring agents include thymolphthalein, phenolphthalein, and alizarin yellow GG. In other embodiments, different or additional acid-base indicators may be included. The first fluid may include a fluid having buffering compounds that establish the first color characteristic for the paint composition, a binder, one or more rheology agents (e.g., viscosity modifiers), one or more surfactants, microcapsules, other chemicals, or combinations thereof. The instructions may include one or more charts, tables, computer applications, or other media that enable determination of appropriate quantities (e.g., volumes or weights) of particular coloring agents needed to produce a paint with the first color characteristic for a particular volume of the first fluid.

When the paint composition is a single fluid, a user may order the paint composition with a particular color. The single fluid provided by a supplier may include the first fluid, the coloring agent needed to produce the first color characteristic, the binder, one or more rheology agents (e.g., viscosity modifiers), one or more pH buffer compounds, one or more surfactants, the microcapsules, other chemicals, or combinations thereof.

The method 100 may include stirring the paint composition, at 102. Stirring the paint composition may distribute components of the paint composition (e.g., the binder, the coloring agent, and the microcapsules) throughout the paint composition. The first fluid maintains the coloring agent in a first protonation state.

The paint composition with distributed components due to stirring may be applied to a surface to form a painted surface, at 104. The paint composition may be sprayed onto the surface, brushed on the surface, rolled on the surface, sponged onto the surface, or otherwise applied to the surface. When the paint composition is used to form a design, a stencil, tape, or other type of mask may be used to limit where the paint composition is applied. The paint composition may be allowed to dry to paint. The paint may have the first color characteristic based on the first protonation state of the coloring agent. When the paint dries, the microcapsules in the paint may be distributed throughout the paint in close proximity to the coloring agent.

A person may make a decision to change the first color characteristic to a second color characteristic, at 106. When the decision is not to change the first color characteristic, the decision may be revisited at a subsequent time. When the decision is to change the first color characteristic to the second color characteristic, at least a portion of the microcapsules in the paint may be ruptured, at 108. The microcapsules include a chemical compound. Rupture of at least a portion of the microcapsules releases the chemical compound and exposes the coloring agent in the paint to the chemical compound to change the coloring agent from the first protonation state with the first color characteristic to the second protonation state with a second color characteristic. The second color characteristic is visually distinct from the first color characteristic. For example, the first color characteristic may be an orange color, and the second color characteristic may be no color or substantially no color.

The microcapsules may be ruptured by exposing the paint to one or more conditions. The conditions may include exposure to heat, exposure to particular ranges of electromagnetic radiation, exposure to a magnetic field having at least a threshold strength, exposure to external pressure, or combinations thereof.

Thus, FIG. 1 illustrates an example of preparing and using a paint composition with color change characteristics. The paint composition may be stirred to distribute components of the paint composition throughout the paint composition. The paint composition may have a first color characteristic. After stirring, the paint composition may be applied to a surface and may be allowed to dry to paint. Subsequently, at least a portion of microcapsules in the paint may be ruptured to expose coloring agent in the paint to a chemical that changes a first protonation state with the first color characteristic to a second protonation state with a second color characteristic that is different than the first color characteristic.

The previous description of the disclosed embodiments is provided to enable a person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A paint composition comprising:
   a fluid;
   a coloring agent in the fluid, wherein the fluid maintains the coloring agent in a first protonation state, and wherein the coloring agent exhibits a first color characteristic in the first protonation state;
   microcapsules in the fluid; and
   a chemical compound in the microcapsules, wherein rupture of at least a portion of the microcapsules is configured to release the chemical compound and expose the coloring agent to the chemical compound to change the coloring agent from the first protonation state with the first color characteristic to a second protonation state with a second color characteristic, the second color characteristic visually distinct from the first color characteristic.

2. The paint composition of claim 1, further comprising a binder in the fluid, the binder configured to form a film when the paint composition is applied to a surface.

3. The paint composition of claim 1, further comprising a rheology agent, a surfactant, a pH buffer compound, or combinations thereof, in the fluid to adjust characteristics of the paint composition.

4. The paint composition of claim 1, wherein the coloring agent in the first protonation state includes a compound with a blue color, a compound with a magenta color, a compound with a yellow color, or combinations thereof.

5. The paint composition of claim 4, wherein the compound with a blue color comprises thymolphthalein, wherein the compound with a magenta color comprises phenolphthalein, and wherein the compound with a yellow color comprises alizarin yellow GG.

6. The paint composition of claim 1, wherein the first protonation state is a deprotonated state, and wherein the fluid is a basic aqueous solution.

7. The paint composition of claim 6, wherein the chemical compound comprises an acid.

8. The paint composition of claim 1, wherein the coloring agent is colored when the coloring agent has the first color characteristic, and wherein the coloring agent is substantially colorless when the coloring agent has the second color characteristic.

9. The paint composition of claim 1, wherein the portion of the microcapsules are configured to rupture when exposed to a magnetic field with a strength over a threshold strength, when exposed to a range of ultraviolet light, when exposed to microwaves, or when exposed to combinations thereof.

10. The paint composition of claim 1, wherein each microcapsule includes a polymer shell encapsulating a portion of the chemical compound.

11. The paint composition of claim 1, wherein the microcapsules have a mean characteristic dimension of less than 10 µm.

12. A method comprising:
    stirring a fluid comprising a coloring agent, a binder, and microcapsules to distribute the binder, the coloring agent, and the microcapsules in the fluid, wherein the fluid maintains the coloring agent in a first protonation state, wherein the microcapsules contain a chemical compound, and wherein rupture of at least a portion of the microcapsules is configured to release the chemical compound and expose the coloring agent to the chemical compound to change the coloring agent from the first protonation state to a second protonation state; and
    applying the fluid to a surface to form a painted surface, wherein the painted surface has a first color characteristic based on the first protonation state of the coloring agent before rupture of at least the portion of the microcapsules, and wherein the painted surface has a second color characteristic based on the second protonation state in response to rupture of at least the portion of the microcapsules.

13. The method of claim 12, wherein the coloring agent comprises at least one acid-base indicator.

14. The method of claim 12, wherein the fluid further comprises a buffering compound.

15. The method of claim 12, wherein the microcapsules are configured to rupture when exposed to a magnetic field with at least a threshold strength, when exposed to microwaves, when exposed to a particular wavelength range of ultraviolet light, or when exposed to combinations thereof.

16. The method of claim 12, wherein the coloring agent is colored when the coloring agent has the first color characteristic, and wherein the coloring agent is substantially colorless when the coloring agent has the second color characteristic.

17. A method of changing a first color characteristic of paint applied to a surface, the paint including a binder, a coloring agent in the binder, and microcapsules in the binder, the method comprising:
    rupturing at least a portion of the microcapsules in the paint, wherein rupturing at least the portion of the microcapsules exposes the coloring agent to a chemical in the microcapsules to change the coloring agent from a first protonation state with the first color characteristic to a second protonation state with a second color characteristic, the second color characteristic visually distinct from the first color characteristic.

18. The method of claim 17, wherein rupturing at least the portion of the microcapsules comprises exposing the paint to a magnetic field of at least a threshold strength.

19. The method of claim 17, wherein rupturing at least the portion of the microcapsules comprises exposing the paint to a particular wavelength range of electromagnetic radiation.

20. The method of claim 19, wherein the particular wavelength range includes microwaves, ultraviolet light, or both.

\* \* \* \* \*